Jan. 6, 1931. A. KAHLOW ET AL 1,788,059
PNEUMATIC TIRE
Filed Aug. 15, 1929
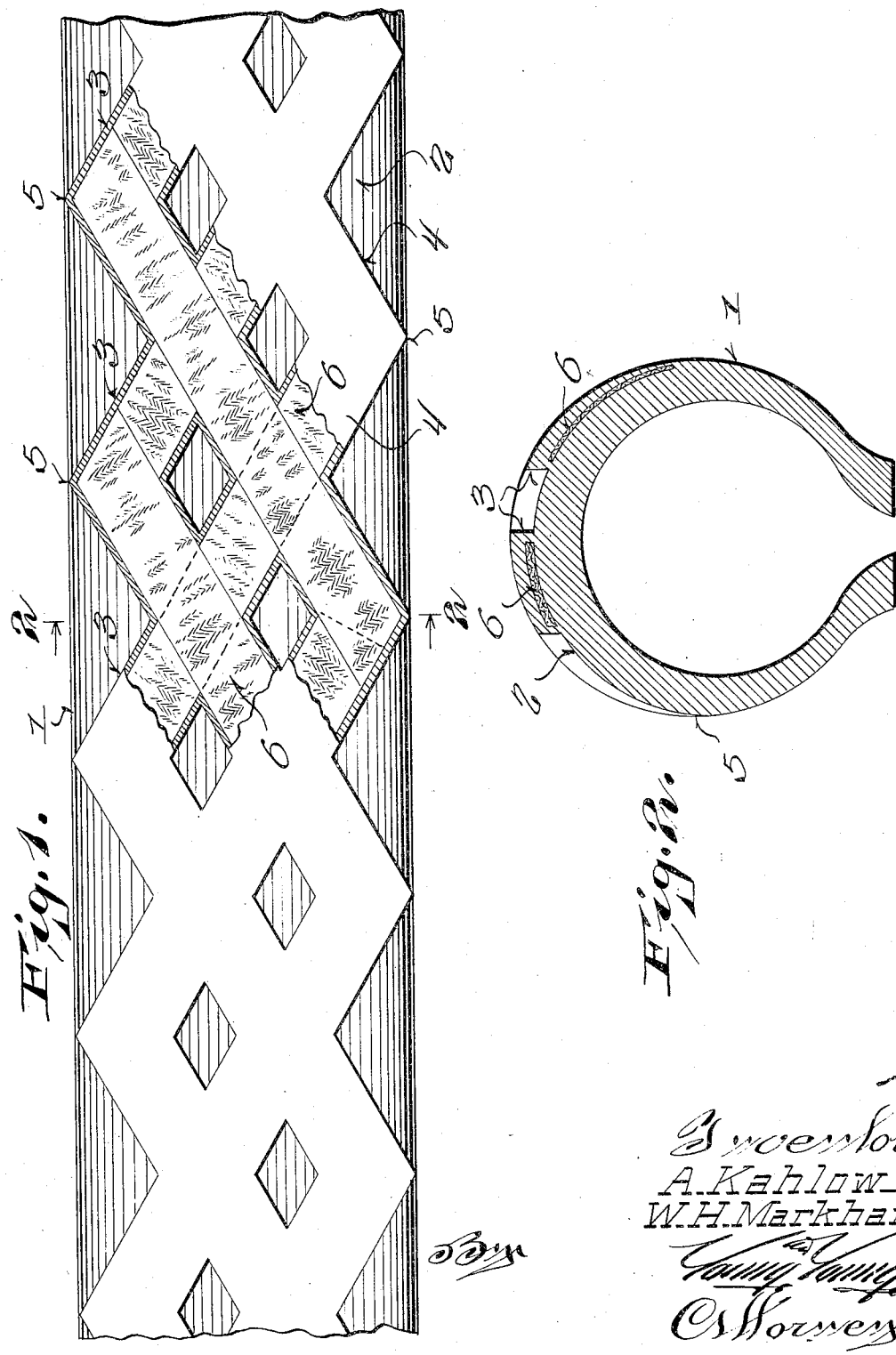
Inventors
A. Kahlow
W.H. Markham Patented Jan. 6, 1931

1,788,059

UNITED STATES PATENT OFFICE

ARTHUR KAHLOW, OF MAYVILLE, AND WILLIAM H. MARKHAM, OF HORICON, WISCONSIN

PNEUMATIC TIRE

Application filed August 15, 1929. Serial No. 386,093.

This invention pertains to improvements in pneumatic tires, and has primarily for its object to provide a pneumatic tire casing with an improved tread structure which eliminates skidding in all directions without the use of chains or other anti-skid devices.

Incidental to the foregoing, a more specific object of the invention is to provide a tire casing with a tread formed integral therewith, and comprising a plurality of circumferential webs having diagonal stretches crossing one another to form a mesh work, said webs being reenforced by embedded strips of pliable material, such as fabric, leather, or the like.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawing, Figure 1 is a fragmentary elevation of a portion of a tire casing constructed in accordance with the present invention, parts being broken away and in section to more clearly illustrate structural features; and Figure 2 is a transverse section taken on the line 2—2 of Figure 1.

Referring now more particularly to the accompanying drawing, the numeral 1 designates a conventional casing for pneumatic tubes, which may be of any well-known structure, inasmuch as this forms no specific part of the present invention.

As best shown in Figure 1, the tread portion 2 of the casing is provided with a plurality of circumferential webs 3, each of which is provided with diagonal stretches 4, extending in opposite directions from side to side of the tread portion of the tire, and crossing one another to form a continuous mesh work.

It will be apparent from the drawing that the oppositely extending diagonal stretches 4 form apexes 5 at the sides of the casing, and due to the fact that three continuous webs are provided, the apexes 5 alternate upon opposite sides of the tread, which results in a continuous circumferential mesh of uniform transverse width throughout. Therefore, at all times, a uniform tread is provided, which due to the diagonal sides of the stretches 4, extending in four directions, provides a secure grip upon the roadway to prevent slippage or skidding in every direction. Also, inasmuch as the apexes 5 of the webs 3 terminate at the side of the tire, the same will engage the sides of ruts in the roadway and materially facilitate climbing out of the same.

While various forms and methods of manufacture may be employed in forming the tread upon the surface of the casing 1, it is preferred to construct the mesh separately from the tire and thereafter vulcanize the same to the casing. Such method facilitates the reenforcing of the webs 3 by means of strips 6 formed of pliable material, such as fabric, leather, or the like, which may be readily embedded into the webs prior to their attachment to the casing. The strips 6 are exceedingly thin compared to the height of the webs 3, and thus in use, the casing may be run for a considerable distance before the reenforcing strips are exposed, and thereafter the tire may be used in the manner of conventional tires which have no anti-skid treads.

From the foregoing description, it will be readily appreciated that a comparatively simple and inexpensive casing has been provided, which not only eliminates skidding and increases traction, but materially lengthens the life of the casing.

It will also be apparent that the present tread differs materially from conventional types of treads in that the reenforcing strips permit the use of a tread of maximum depth essential to increase traction and prevent skidding.

In addition to reenforcing the webs 3, the strips 6 further serve as means for securely anchoring the webs to the face of the casing, as in vulcanizing the tread mesh upon the casing, the strips 6 are caused to be securely united thereon.

We claim:

1. A pneumatic tire casing provided with a plurality of continuous circumferential webs, each comprising oppositely extending diagonal stretches, crossing the stretches of the adjacent webs and forming spaced apexes upon opposite sides of the casing, said apexes on each side of the casing having a staggered relation to those on the opposite side.

2. A pneumatic tire casing provided with a plurality of continuous circumferential webs, each comprising oppositely extending diagonal stretches, crossing the stretches of the adjacent webs and forming spaced apexes upon opposite sides of the casing, said apexes on each side of the casing having a staggered relation to those on the opposite side and reenforcing fabric strips embedded in said webs.

In testimony that we claim the foregoing we have hereunto set our hands at the city of Horicon, in the county of Dodge and State of Wisconsin.

ARTHUR KAHLOW.
WILLIAM H. MARKHAM.